No. 786,964. PATENTED APR. 11, 1905.
A. H. EMERY.
RECOIL GUN CARRIAGE.
APPLICATION FILED JUNE 22, 1900. RENEWED FEB. 17, 1905.

Witnesses
Harry A. Knight

Inventor
A. H. Emery
By Knight Bros.
Attorneys

No. 786,964. PATENTED APR. 11, 1905.
A. H. EMERY.
RECOIL GUN CARRIAGE.
APPLICATION FILED JUNE 22, 1900. RENEWED FEB. 17, 1905.

No. 786,964. PATENTED APR. 11, 1905.
A. H. EMERY.
RECOIL GUN CARRIAGE.
APPLICATION FILED JUNE 22, 1900. RENEWED FEB. 17, 1905.

No. 786,964. PATENTED APR. 11, 1905.
A. H. EMERY.
RECOIL GUN CARRIAGE.
APPLICATION FILED JUNE 22, 1900. RENEWED FEB. 17, 1905.

No. 786,964.                                                         Patented April 11, 1905.

UNITED STATES PATENT OFFICE.

ALBERT H. EMERY, OF STAMFORD, CONNECTICUT.

RECOIL GUN-CARRIAGE.

SPECIFICATION forming part of Letters Patent No. 786,964, dated April 11, 1905.

Application filed June 22, 1900. Renewed February 17, 1905. Serial No. 246,071.

*To all whom it may concern:*

Be it known that I, ALBERT H. EMERY, a citizen of the United States, and a resident of Stamford, in the county of Fairfield and State of Connecticut, have invented certain new and useful Improvements in Recoil Gun-Carriages, of which the following is a specification.

My invention relates to the general class of recoil gun-carriages, and more especially to that type of carriages known as "disappearing" gun-carriages; and the object of my invention is to apply to such gun-carriages certain mechanisms that will better adapt the carriage to perform its functions and also to improve the details of construction of some parts that have heretofore been employed in combination with such carriages.

One feature of my present invention relates to an improved construction of hydraulic recoil-buffer, also to the mode of application of the same to the gun-carriage.

Another feature of my present invention relates to the construction of a pressure-reservoir, which reservoir is adapted to receive and store up work derived from the recoil of the gun or other source and to give out said work as desired for the operation of working parts of the carriage—such, for instance, as the hydraulic recoil-buffer referred to.

A further feature of my invention relates to a locking device to hold the gun in loading position and prevent premature rise of the gun.

A further feature relates to the construction and arrangement of stop-buffers adapted to arrest the downward movement of the gun with a yielding force and to ultimately bring the gun to exact loading position.

A further feature of my invention consists in combining with an elevating gun-carriage a balance so located that it will relieve the elevating mechanism from undue friction while the gun is in loading position and the elevating mechanism is being adjusted.

For the purpose of illustration I have here shown these devices applied to a disappearing gun-carriage of a general form disclosed by my pending application, Serial No. 491,686, filed November 22, 1893.

The improved form of carriage here illustrated shows the devices here claimed, together with a number of other improvements to be claimed in other applications hereinafter.

My present invention will be understood upon reference to the accompanying drawings, in which—

Figure 1:
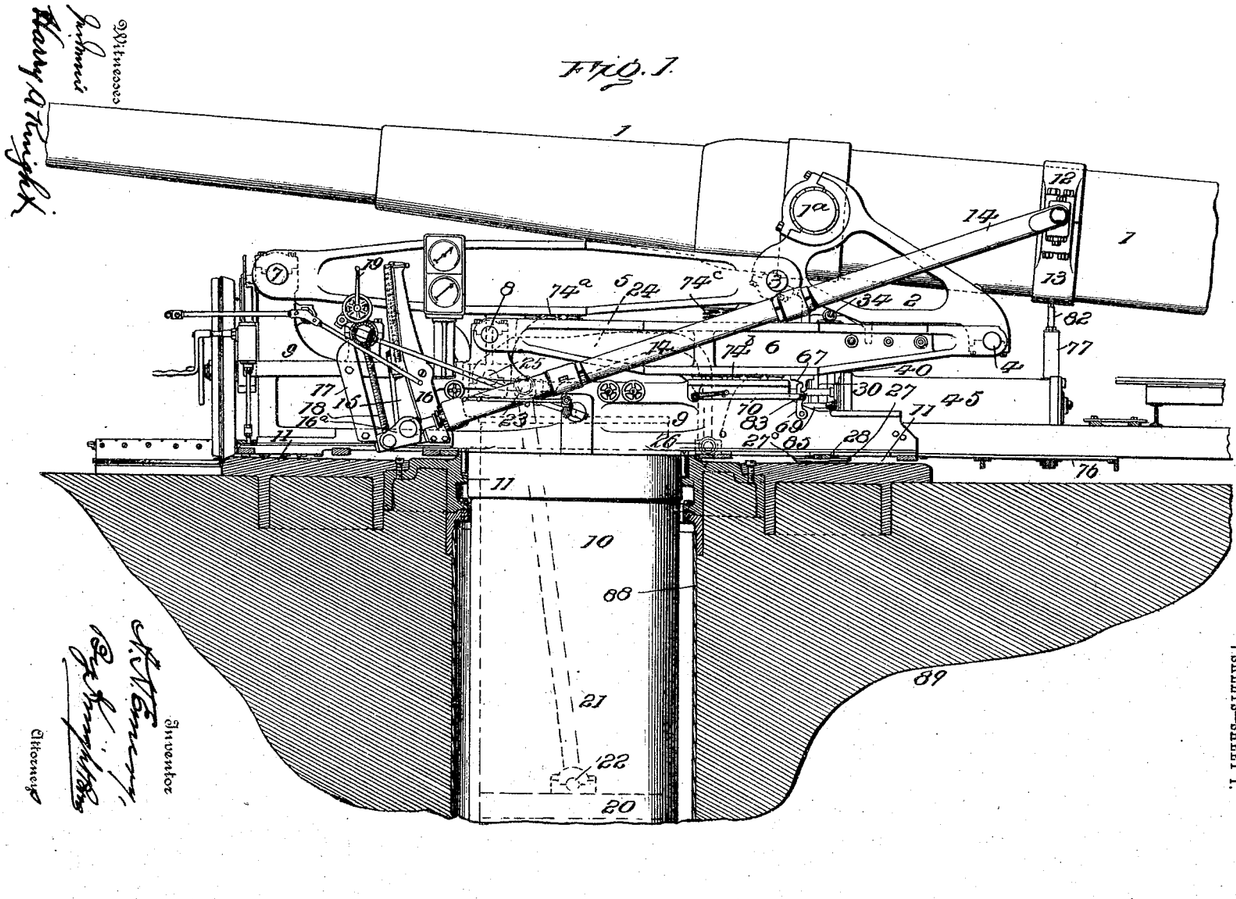
Figure 1 is a side elevation of a portion of the gun and its operating-carriage, showing the carriage in elevation and a foundation in section.

Referring to Fig. 1, which shows the general location of the various devices forming parts of my present invention, 1 represents a portion of the gun mounted on a carriage to which it is connected by its trunnions $1^a$, which rest in the saddle 2, this being trunnioned by pins 3 and 4 to the two elevating-links 5 and 6, which are trunnioned by pins 7 and 8 to the carriage-body 9, which rests on and is bolted to the cylinder 10, contained in the curb 88, which is secured to the bed 11 and set permanently in the masonry 89. The bed 11 is bolted firmly to the masonry. Around the breech of the gun is an elevating-band consisting of parts 12 and 13 securely bolted together, trunnioned to which at their upper ends are the elevating-rods 14. The lower ends of these rods are secured by pin connections to the sliding shoes 15, which slide up and down in the guide-sweeps 16 and 17, being caused to do so by the operating-screws 18, which are driven by the cranks 19 through suitable gears. In the cylinder 10 is a piston 20, operated by any suitable means, which carries a piston-rod 21, trunnioned to the piston 20 by the pin 22 and trunnioned to the yoke-beam 24 by the pin 23. The yoke-beam 24 is trunnioned to the links 5 and 6 by the pins 25 and 26.

Figures 2, 3, 4:
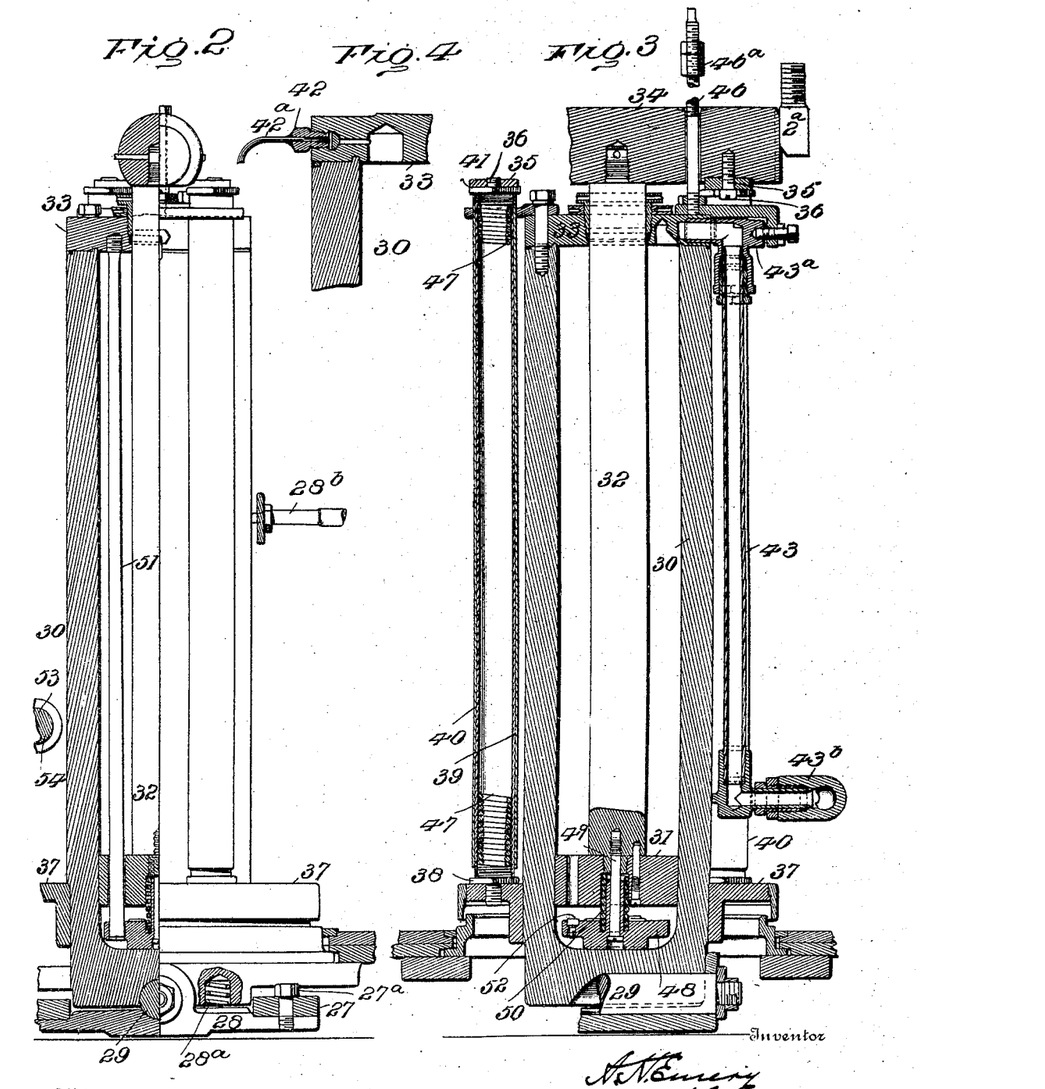
Fig. 2 shows the recoil-buffer partly in elevation and partly in section.
Fig. 3 shows a vertical section of the buffer on the line 3 3 of Fig. 5.
Fig. 4 shows a sectional view of an air-vent.
Figure 5:
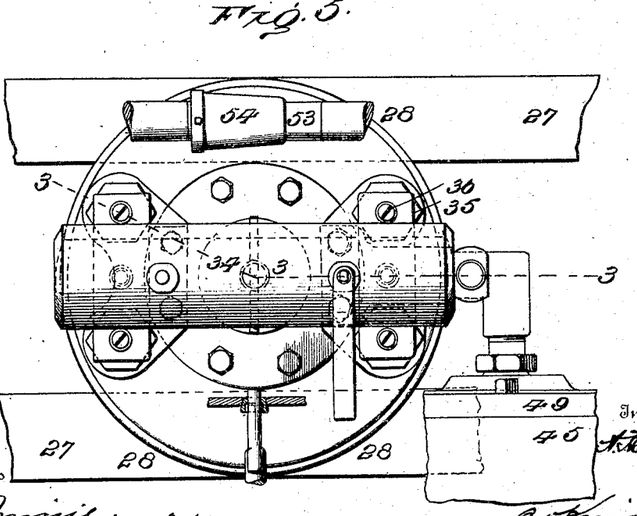
Fig. 5 shows a plan of the recoil-buffer resting on its supports.

*Recoil-buffer.*—Bars 27 are secured to the carriage-body 9. These bars carry the shoe 28, on which rests the pin 29, which carries the buffer 30. In setting the buffer 30 in proper position the bars 27 and shoe 28 are so constructed, arranged, and adjusted with the carriage-body that when the buffer has heavy pressure on it the bars 27 spring down and allow the shoe 28 to rest directly on the bed 11, so that but little pressure is transmitted by the buffer to the carriage, the heavy pressure put upon it in its downward movement going directly to the bed. The recoil-buffer consists of its cylinder 30, with its piston 31, piston-rod 32 sliding through a packing in a head 33 and carrying at its top end a cross-bar 34, which in operation rests against the saddle 2 when the gun nears its downward position. If the saddle is not used, as is the case when there is only one link instead of two links 5 and 6, this head 34 might rest directly in a shoe cut in or attached to the trunnion-band of the gun when the gun nears its lower position. The cross-head 34 carries two bars 35, secured to it by screws 36. Around the cylinder 30 is a casting 37, on which rest the screw-caps 38, which support the lower end of the spring-cases 39, which telescope with the outer cases 40, the latter having caps 41, which secure them to the plates or bars 35. 42 42$^a$ represent an air-vent to this buffer. (Shown in Fig. 4.) 43 is a pipe (shown in Fig. 3) which connects this buffer with the pressure-reservoir to keep it fully supplied with liquid. This pipe has jointed connections 43$^a$ 43$^b$ connecting it with the buffer and the pressure-reservoir. 43$^b$ connects directly with a head 44 of the reservoir 45.

46 is a rod (shown in Fig. 3) which carries a nut 46$^a$, adjusted to lock the buffer from opening under the spring-pressure whenever the buffer is not in use, if desired. This is removed when the carriage is in use.

47 represents springs contained in the telescopic spring-cases 39 and 40.

Figure 6:
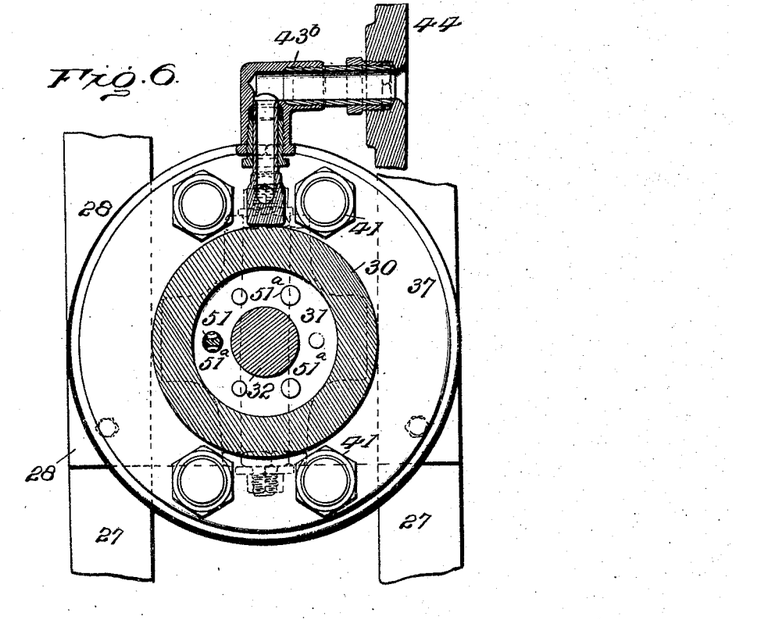
Fig. 6 shows a plan of the buffer, with the cylinder and piston-rod in section.

The piston 31 is provided with a valve 48, secured to it by the guiding-screw 49. The valve 48 is held open by the spring 50 around the guiding-stem of the valve. This spring is so adjusted, in conjunction with the weight of the valve 48 and the velocity of the gun when nearing its lower position, that should the gun be moving too fast for the main recoil-press to stop it when the saddle strikes the cross-bar 34 and starts the piston 31 downward quickly the inertia of the valve 48 holds it with sufficient force to compress the spring 50 and force the plugs 52 into the openings in the piston 31, thereby closing said openings. The liquid then below the piston is forced through grooves in the throttling-rods 51, of which in the present illustration three are used. One of these throttling-rods 51 is shown in elevation in Fig. 2. Three are used in this case, as indicated by holes 51$^a$ in the piston 31, as shown in Fig. 6, where only one of the throttling-bars is shown.

In use the springs 47 should always be sufficient, in conjunction with the pressure on the liquid of the reservoir, to cause the piston to rise whenever the gun or saddle is lifted to allow it to do so, and this adjustment should be such as to secure with certainty the rising of the piston to the extreme extent allowed, so that should the gun be descending at the lower part of its stroke with too great velocity the valve 48 will close and force the liquid in the buffer to be throttled through the variable grooves in the throttling-bars 51. As the piston-rod 32 is forced in, a part of the liquid in the cylinder 30 is forced through the pipe 43 into the pressure-reservoir 45, and as the gun rises the liquid in the reservoir and the springs 47 again return the piston 31 to the top of the recoil-buffer. With this construction this buffer gives little or very slight resistance to the downward motion of the gun, except in those cases in which the recoil-press has not sufficiently checked the downward velocity of the gun, in which event this buffer comes into play by the closing of the valve 48 to give it very great resistance to the downward motion of the gun. The resistance of this buffer should be such in this case as to use up nearly all the inertia in the moving parts of the gun and carriage, except so much as will be absorbed by the remainder of the stroke of the recoil-press. As the saddle goes up and the cross-head 34 follows it, the buffer must tip to the left and remain so, so as to be in proper position to strike its seat in the saddle when the gun descends. To insure this, a spring 28$^a$, resting on the shoe 28, presses against the buffer, causing it to rotate to the left around the pin 29 against the adjustable stop 54, secured to the bar 53. To further insure the buffer being in this proper position, there may be used a push-rod 28$^b$, which is held against the buffer with sufficient force by springs or other suitable means to cause it to move to the left against the adjusting-collar 54 when the gun rises, or either of these spring devices may be used alone if properly proportioned. To insure proper action of the buffer, the air should always be removed by opening the air-vent 42 42$^a$. (Shown in Fig. 4.) This is done by giving it a quarter or half of a revolution and allowing it to remain open as long as air blows out and closing it as soon as liquid begins to come out of the pipe 42$^a$.

Figure 7:
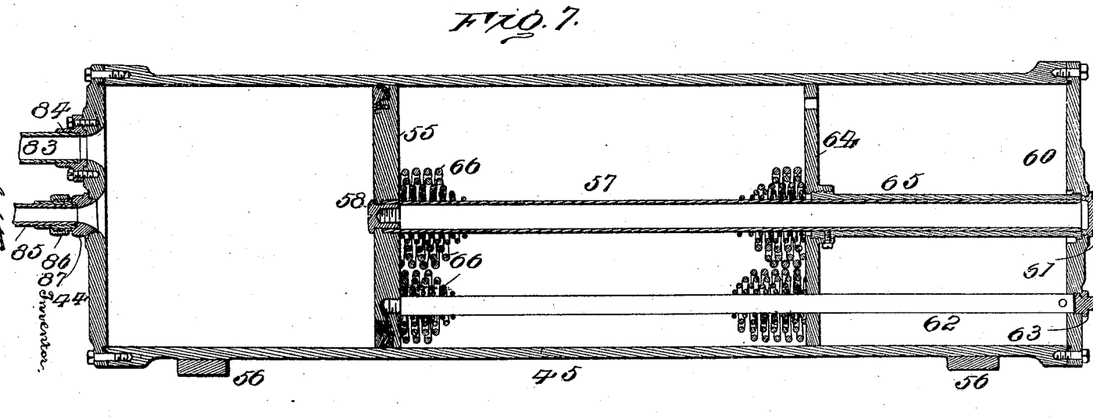
Fig. 7 shows a vertical axial section of the spring-reservoir.
Figure 8:
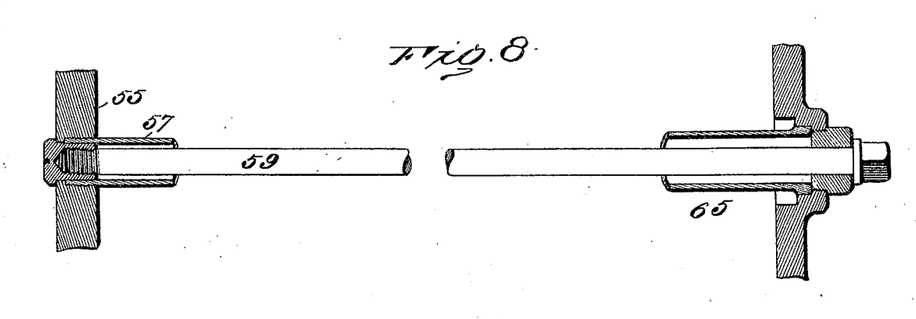
Fig. 8 shows a retaining-rod for holding the reservoir-piston against its loading-springs when adjusting its packing.

*Pressure-reservoir.*—The construction of the pressure-reservoir 45 (shown in Fig. 7) is substantially as follows: A cylinder 45, usually of steel, is nicely bored and closed at each end by the heads 44 and 60. 55 is a moving piston which is guided by a stem 57, which plays up and down in the sleeve 65. The latter supports substantially in position against tipping the piston 64, against which rest a series of spiral springs 66, which are coiled around the stem 57 and a series of guide-rods 62. 61 and 63 are caps in the head 60 to close the openings through which the guide-rods and sleeve pass in constructing and erecting. 58 is a screw-cap which closes the opening in the piston 55. This piston is suitably packed in the usual way. Liquid is introduced under pressure in this cylinder through the pipe 83, secured to the head 44 by the pipe-flange 84. I prefer to employ a pair of these pressure-reservoirs, and the pipe 85, secured to the head 44 by the coupling-pieces 86 and 87, supplies the other reservoir (obscured from view) with liquid, so that the two are charged alike. Whenever it is desired to adjust or replace the packings of the piston 55, the liquid is drawn off from the reservoir, leaving the piston 55 resting against the head 44, where it is secured against the pressure of the springs 66 by the rod 59, when the head 44 may be removed and the packings adjusted or replaced. The number of guide-rods 62 which may advisably be screwed into the piston 55 will depend on the power and size of the reservoir. In the present instance there are several arranged around the central stem, one only of which is here shown. They should always be arranged symmetrically, so that the springs will not give unequal pressure and tend to tip the piston 55. 56 are bars on which the reservoir-cylinder 45 rests. This reservoir may be either high or low pressure, according to the functions it is to perform in the carriage. In the design illustrated it is one of the low-pressure reservoirs, the high-pressure reservoirs being preferably contained in the central cylinder 10. The pipe 83 will lead to the valve-block, where the liquid is transferred to either the high or low pressure reservoir or to the recoil or elevating presses.

Figures 9, 10:
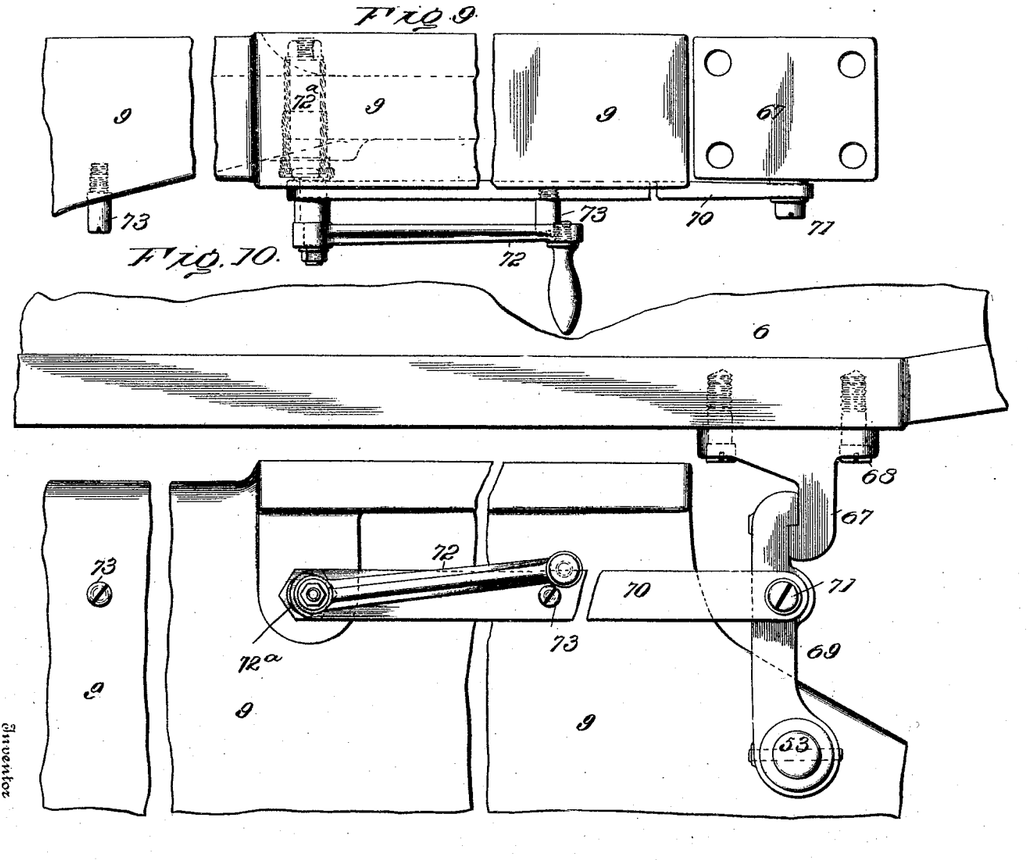
Figs. 9 and 10 show the locking device in plan and elevation, together with portions of the carriage to which it is attached.

The locking device referred to (shown in Figs. 9 and 10) consists of a shaft 53, fixed in the carriage-body 9, to which are fastened one or two (usually two) latches 69, which interlock into their shoes 67, secured by screws 68 to the link 6. The latches 69 are operated by bar 70, secured to them by bolts 71. This bar 70 is operated to throw the latch out or in by the shaft $72^a$ and crank 72, which latter rests, when the latch is in or out, alternately on one of the studs 73. The shaft $72^a$, on which the crank 72 turns, has an eccentric bearing which causes the bar 70 to move to the right or left by the semirevolution of the crank.

Figure 11:
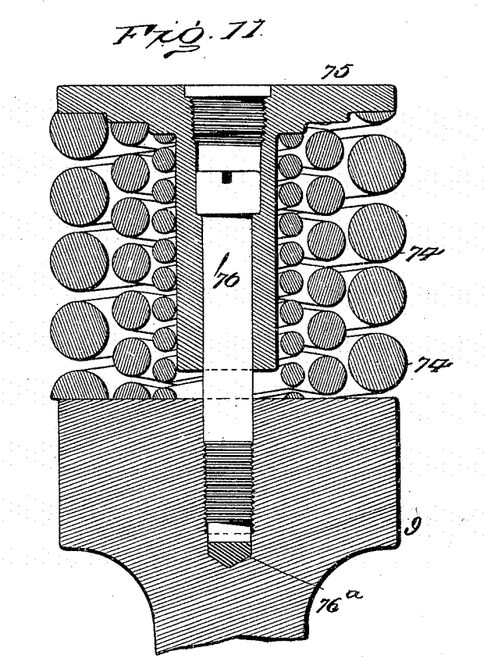
Figs. 11, 12, and 13 show vertical sections of the adjustable stop-buffers, with a portion of the parts to which they are attached.
Figure 12:
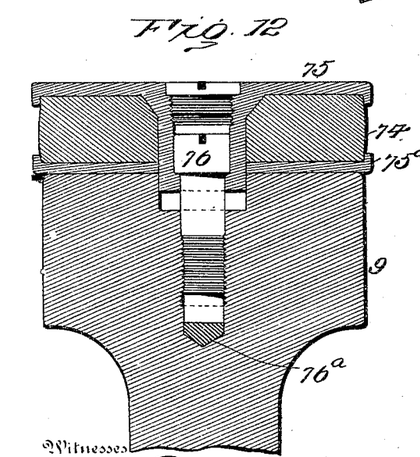
Figure 13:
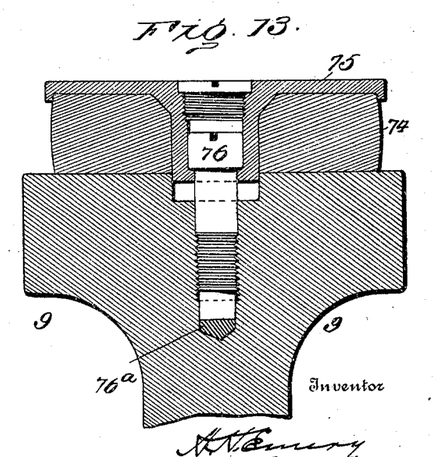

The stop-buffers referred to are shown in Figs. 11, 12, and 13, and consist of caps 75, springs 74, and adjusting-screws 76. These screws 76 are screwed solid against lead or other suitable filling $76^a$, so adjusted as to hold the cap at the right place to hold the levers in proper position for loading the gun, which in the carriage shown is to hold them just level. In Figs. 12 and 13 the springs 74 are rubber. Fig. 12 shows a rubber buffer 74, confined between the two caps 75 $75^a$, and therefore has a greater resistance than that shown in Fig. 13, which has but one cap. This extra cap gives the buffer, with the same dimensions of rubber, more resistance, which is needed, owing to the position which it has in the carriage. In Fig. 11 the springs 74 are coiled helical springs instead of rubber. As placed these springs receive more motion than do the rubber springs, and they are constructed to readily permit of this increased motion. In use these springs are best constructed and arranged, as shown in Figs. 1, 11, 12, and 13, with such proportions that when the levers 5 and 6 come down and strike them the levers can still move farther down, but will be brought back to their level normal position for loading by the action of these stop-buffers, which are so proportioned and arranged as not to tend greatly to rotate the saddle 2. In Fig. 1 a set of six of these rubber buffers (marked $74^a$) is shown resting near the left-hand end of the lever 6. When lever 5 comes down and strikes these, the pressure on them tends to stop lever 5 and carry lever 6 farther down; but lever 6 at the same time strikes a set of ten of these buffers, (two pairs of five each.) (Marked in Fig. 1 $74^b$.) These rest on and are secured to the carriage-body 9 and exercise a strong opposing force to the downward motion of the lever 6 and cause it to come to rest in its normal level position.

The spiral springs shown in Fig. 11 are secured to lever 6, as shown in Fig. 1 at $74^c$, and are so adjusted as to be struck by the lever 5 when it reaches its normal level position and tend to stop its further downward movement and to bring it back and hold it to its level position while the gun is resting in loading position. By means of the screw 76 a heavy pressure is always put upon each of these stop-buffer springs to bring them to the right height to support the levers in their horizontal position when they rest on these buffers.

Figures 14, 15:
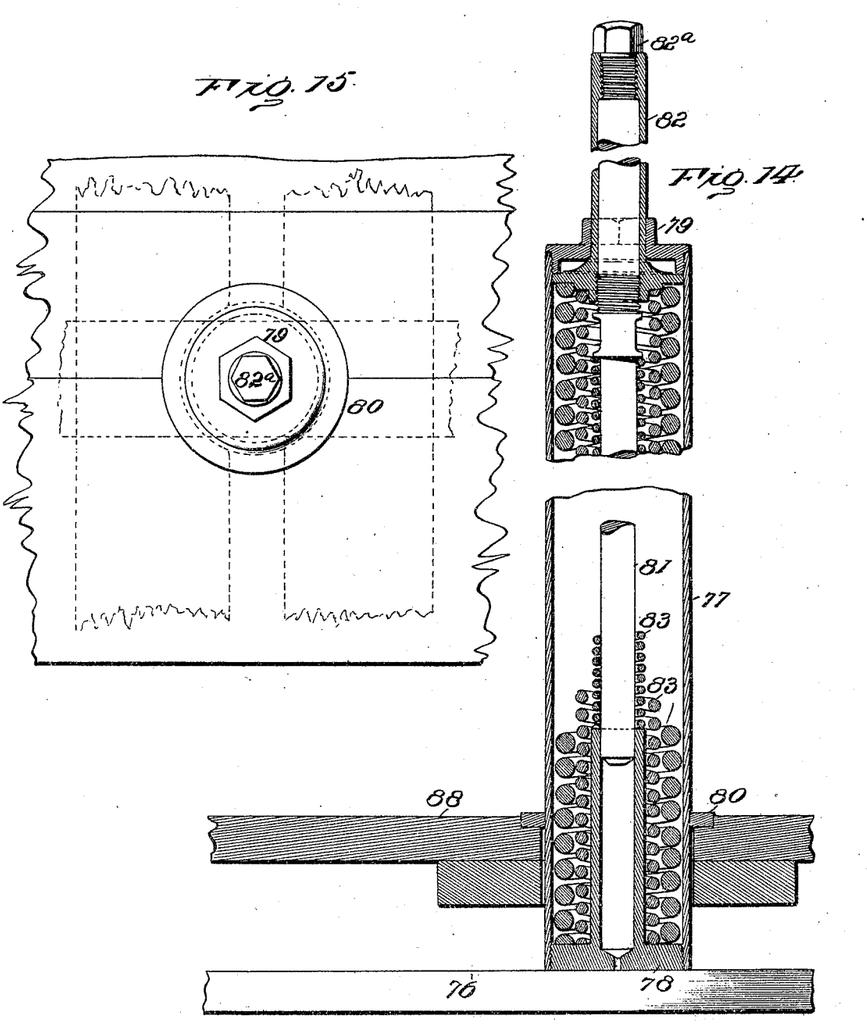
Figs. 14 and 15 show a vertical section and a plan of the gun-balance.

The gun-balance 77 is shown in position in Fig. 1, resting on the bar 76 of the carriage and supporting the loading-band 12 13 in its proper position. This balance is shown in Figs. 14 and 15, where 77 is the outer case of the balance. It has lower and upper heads 78 and 79. 80 is a rubber ring, which prevents water and dirt from going through the floor 88 through the opening made for the balance 77. 81 is the balance-rod, with a head 82, provided with a cap $82^a$. This balance-rod 81 and its head 82 are forced against the elevating-band 13 by one or more spiral springs 83 around it. When the gun descends, the angle of elevation as it nears the gun-balance is greater than when at rest, so that the rod is pressed down below its normal position by the elevating-ring, the cap 82 sliding through the upper head 79, while the lower end of the rod is guided in a sleeve, which projects from the lower head 78 of the balance, and when the gun comes to rest in its normal position for loading the springs 83 hold the rod 81 82 82ª firmly against the elevating-band 13 to balance its weight or its weight and a portion of that of the elevating-rods 14. The guns are substantially constructed to balance on the trunnions before the elevating-band 12 13 is put in position. The weight of this band tends to rotate the breech end of the gun downward; but this tendency is checked by the rods 14, which under the action of the weight of the elevating-band 12 13 causes the bearings of the shoe 15 to press hard against their guides in the sweep 16. This causes much friction and makes the elevating-screws 18 turn hard. To avoid this friction, the gun-balance is provided, and the lifting of this elevating-band 12 13 by the gun-balance 77 largely prevents this thrust on the shoe 15, and so greatly reduces the friction of turning the elevating-screws 18.

Having thus described my invention, the following is what I claim as new therein and desire to secure by Letters Patent:

1. In a recoil gun-carriage, in combination with suitable elevating mechanism and the usual recoil-buffers which act to retard the recoil of the gun throughout the whole of its downward motion, a supplemental hydraulic buffer, independent of the elevating mechanism and the usual recoil-buffers, said supplemental buffer having means whereby it offers a high resistance to a quick movement and a comparatively small resistance to a slow movement, and arranged to check the recoil of the gun during a considerable portion of its downward movement and before it reaches its loading position, but not to check the recoil at all until the gun has passed through a large portion of its recoil-path.

2. In a recoil gun-carriage, in combination with suitable elevating mechanism and the usual recoil-buffers which act to retard the recoil of the gun throughout the whole of its downward motion, and the usual stop buffer or buffers which return the gun to loading position when in recoiling it has passed beyond that place, a supplemental hydraulic buffer, independent of the elevating mechanism and the usual recoil-buffers, having means whereby it offers a high resistance to a quick movement and a comparatively small resistance to a slow movement, and arranged to check the recoil of the gun during a considerable portion of its downward movement and before it reaches its loading position, but not to check the recoil at all until the gun has passed through a large portion of its recoil-path.

3. In a recoil gun-carriage, the combination with suitable elevating mechanism to raise the gun and the usual recoil-buffers which act to retard the recoil of the gun throughout the whole of its recoil motion, a supplemental hydraulic buffer independent of the elevating mechanism and usual recoil-buffer, said supplemental buffer having means whereby it offers a high resistance to a quick movement and a comparatively small resistance to a slow movement, and arranged to check the recoil but slightly when the gun recoils with the usual velocity but with very great resistance when the gun in recoiling reaches this buffer with unusual high velocity for that part of its path, said buffer being arranged to operate through a very material part of the gun's path and under the condition of such unusually high velocity to aid greatly to bring the gun to rest before it reaches the loading position.

4. In a recoil gun-carriage, in combination with suitable elevating mechanism, a recoil-resisting press which resists the recoil of the gun throughout the whole of its downward movement, and the usual stop buffer or buffers which return the gun to loading position when in recoiling it has passed beyond that place, an independent hydraulic buffer having means whereby it offers a high resistance to a quick movement and a comparatively small resistance to a slow movement, and arranged to check the recoil but slightly when the gun recoils with the usual velocity but with very great resistance when the gun in recoiling reaches this buffer with unusually high velocity for that part of its path, said buffer being arranged to operate through a very material part of the gun's path and under the condition of such unusually high velocity to aid very greatly to bring the gun to rest or nearly so before it reaches the loading position.

5. In a recoil gun-carriage, in combination with suitable elevating mechanism to raise the gun and the usual recoil-buffers which act to retard the recoil of the gun throughout the whole of its recoil motion, a supplemental hydraulic buffer having means whereby it offers a high resistance to a quick movement and a comparatively small resistance to a slow movement, and arranged to have its resistance increased very suddenly and very greatly if the speed of recoil exceeds a desired amount, such increase of resistance being greatly in excess of that due to the proportional speed, and due to a sudden great reduction of the passage or passages through which the liquid flows, the reduction or closing of the passages being caused by the excessive speed of recoil.

6. In a hydraulic brake apparatus for ordnance, comprising a cylinder and piston, openings in the piston, a valve carried by the piston controlling said openings and a spring between the piston and valve acting in opposition to the flow of fluid through the piston, whereby during excessive flow, the fluid will carry the valve toward closing position and during insufficient flow the spring will tend to move the valve toward open position.

7. In an elevating gun-carriage, a hydraulic buffer with a plurality of springs arranged around the buffer-cylinder to open the buffer, with telescoping cases around the springs.

8. In an elevating gun-carriage, the combination of a hydraulic buffer, a plurality of springs symmetrically arranged around the buffer-cylinder for opening the buffer, and telescoping spring-cases, the parts of which are connected respectively with the press-piston and with a support against which they rest.

9. In an elevating gun-carriage, a hydraulic recoil-buffer having a cylinder 30 oscillating on a bearing 29, in combination with a stop and a spring forcing the cylinder against the stop to bring the arresting portion of the buffer in proper position to arrest the movement of the gun when the recoil takes place.

10. In an elevating gun-carriage, a hydraulic recoil-buffer supported on the carriage so closely to the bed over which the carriage is traversed, that when operating as a buffer under action of recoil, the buffer rests directly upon said bed.

11. In an elevating gun-carriage, a hydraulic recoil-buffer supported on the carriage by spring-bars 27, so closely to the bed over which the carriage is traversed, that when operating as a buffer under action of recoil, the buffer rests directly upon said bed.

12. In an elevating gun-carriage, a hydraulic buffer constructed with a piston, a buffer-valve, and a spring between said piston and valve, which causes the valve to remain open and allows the liquid to pass through the piston when it is started slowly, but allows it to close when the piston is started quickly.

13. In an elevating gun-carriage, a hydraulic buffer having a throttling by-pass through which the liquid can always pass when the piston is moved either way, a piston 31, valve 48, and a spring between said piston and valve, which causes the valve to remain open and allows the liquid to pass through the piston when it is started slowly, but allows it to close when the piston is started quickly.

14. In an elevating gun-carriage, a hydraulic buffer, having a throttling by-pass through which the liquid can always flow when the piston moves either way, a piston, a valve, and a spring interposed between the valve and piston, to hold the valve open, the inertia of the valve and the resistance of the spring being so adjusted that the valve starts to close by its inertia when the piston is moved quickly toward it, but remains open when the movement of the piston is slow.

15. In a recoil gun-carriage, the combination with suitable elevating mechanism to raise the gun, a hydraulic buffer independent of the elevating mechanism acting against the gun-saddle, and a pressure-reservoir forcing liquid into said buffer to fill it and cause its piston to move to its upper limit, to be in position to be struck by its seat in the saddle during recoil, and retard the saddle's downward movement.

16. In a recoil gun-carriage, the combination with suitable elevating mechanism to raise the gun, a hydraulic buffer independent of the elevating mechanism, a pressure-reservoir communicating with the buffer, said buffer bringing the gun nearly to rest before it reaches the loading position, and adjustable spring-buffers to aid in rapidly arresting further downward movement after the gun reaches the loading position, and to return it exactly to the loading position.

17. In an elevating gun-carriage, the combination with a recoil-press, a pressure-reservoir comprising a cylinder 45, cylinder-head 44, movable piston 55, spring-abutment 64, guide-rods 62 extending through the abutment, and springs surrounding said guide-rods to force the piston against the liquid contained between it and the cylinder-head 44.

18. In an elevating gun-carriage, the combination with a recoil-press, a pressure-reservoir comprising a cylinder 45, cylinder-head 44, movable piston 55, spring-abutment 64, guide-rods 62 secured to the said piston 55 and extending through the abutment, guiding-stem 57 secured to the piston to prevent its tipping, and springs surrounding said guide-rods to force the piston against the liquid contained between it and the cylinder-head 44.

19. In an elevating gun-carriage, a pressure-reservoir consisting of a cylinder 45, fixed cylinder-heads 44 and 60, movable piston 55, spring-abutment 64 with its supporting and fixing stem 65, springs interposed between the moving piston 55 and the abutment 64, and the guiding-stem 57 rigidly secured to the piston 55 and passing through the fixed abutment 64.

20. In an elevating gun-carriage, a pressure-reservoir consisting of a cylinder 45, fixed cylinder-heads 44 and 60, movable piston 55, spring-abutment 64, guide-rods 62 secured to the moving piston, extending through the spring-abutment and abutting the fixed cylinder-head 60 to limit the motion of the piston 55, and springs interposed between the moving piston 55 and the abutment 64.

21. In combination with a gun-carriage body 9, elevating-link 6 and suitable hydraulic elevating mechanism; the locking device consisting of the interlocking catch 67 and latch 69, and shaft 53 upon which said latch 69 is mounted, bar 70 connected to the part 69, and an operating-crank 72 having connections through which it reciprocates said bar 70 to open and close the locking device.

22. In an elevating gun-carriage, in combination with links 5 and 6, initially-loaded stop-buffers interposed between said links and adjusted to aid in holding the gun at the exact position required for loading.

23. In an elevating gun-carriage, in combination with the links 5 and 6, the initially-loaded stop-buffers 74 interposed between said links having caps 75 and loading-screws 76 adjusted to aid in holding the gun at the exact position required for loading.

24. In an elevating gun-carriage, in combination with the carriage-body 9, a pair of elevating-links 5, 6, a plurality of sets of initially-loaded stop-buffers arranged one set between the carriage-body 9 and the lower link 6, and one or more sets between the links 5 and 6, said buffers being adjusted in length to hold the gun at proper height for loading.

25. In an elevating gun-carriage, in combination with a carriage-body 9, a pair of elevating-links 5 and 6, a saddle 2, a plurality of sets of initially-loaded stop-buffers arranged one set between the carriage-body 9 and the lower link 6, and one or more sets between the links 5 and 6, said buffers being adjusted in length to hold the gun at proper height for loading, and the sets of buffers being so distributed as to cause each set to properly aid in holding the gun in loading position.

26. In an elevating gun-carriage, in combination with the elevating-rods 14, the elevating guide-sweeps 16, sliding shoes 15 which carry the lower ends of the elevating-rods, the band 12, 13, by which these rods are attached to the gun, and the gun-balance on which the gun partly rests while in loading position.

27. In an elevating gun-carriage, a gun-balance constructed with a stem 81 pressed by a spring against the gun or elevating-band when in loading position to reduce the friction on the sliding shoes at the lower ends of the elevating-rods.

ALBERT H. EMERY.

Witnesses:
S. W. HUFF,
H. S. KNIGHT.